April 16, 1929.  C. W. FOULK  1,709,258
DENSITY MEASURING APPARATUS
Filed Sept. 7, 1922
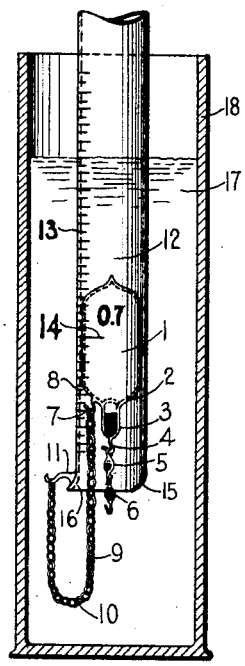
Fig. 1
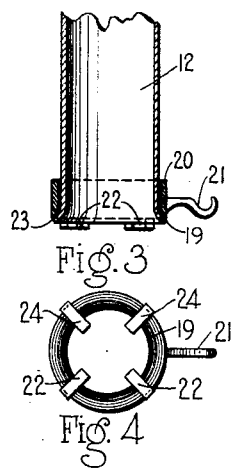
Fig. 3
Fig. 4
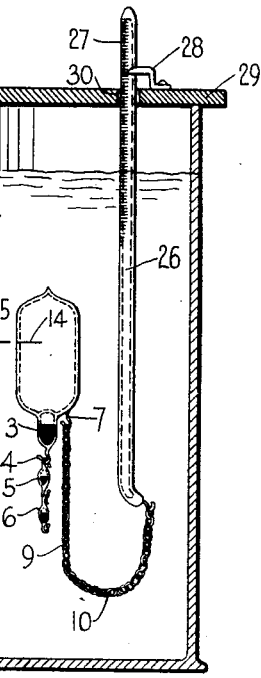
Fig. 5
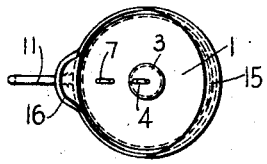
Fig. 2
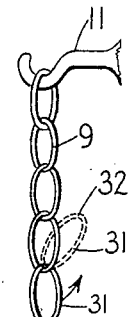
Fig. 6
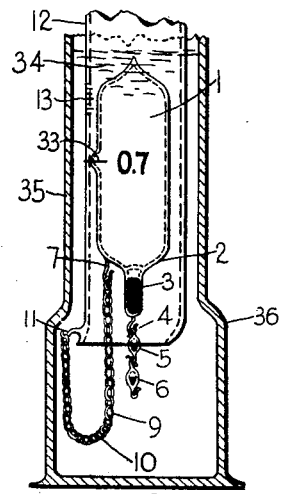
Fig. 7
Sp. Gr. 0.7  0.8  0.9  1.0  1.1  1.2  1.3  1.4  1.5
Series I     0.1  0.2  0.3  0.4  0.5  0.6  0.7  0.8
Series II 0.00 0.01 0.02 0.03 --------- 0.09
Fig. 8
Charles W. Foulk  INVENTOR.
BY
Edwin P. Corbett  ATTORNEY.

Patented Apr. 16, 1929.

1,709,258

UNITED STATES PATENT OFFICE.

CHARLES W. FOULK, OF COLUMBUS, OHIO, ASSIGNOR TO THE KAUFFMAN & LATTIMER COMPANY, OF COLUMBUS, OHIO, A CORPORATION OF OHIO.

DENSITY-MEASURING APPARATUS.

Application filed September 7, 1922. Serial No. 586,653.

My invention relates to a density measuring apparatus and has to do particularly with the provision of a novel type of instrument for accurate measurement and direct determination of the density or other properties of liquids.

In the past, in determining the specific gravity of a liquid to any high degree of accuracy, it has been the practice to utilize a highly perfected balance in combination with many weights, or balances of the beam and chain type wherein the bob is hung from a balanced beam and immersed in the liquid and sliding weights and a weighing chain are attached to the beam to determine the specific gravity. In all instances, where any appreciable amount of accuracy was required, the correct adjustment or placing of weights in connection with the balance beam required a great amount of skill and a long and somewhat difficult test had to be made before the desired result was obtained. Furthermore, as specific gravity readings of this class always require a great amount of accuracy, it has been necessary to provide an intricate and expensive balance of the finest precision and sensitiveness.

My invention has to do primarily with the provision of a density measuring apparatus which will automatically adjust itself relative to the density of the liquid and which will give the density of any such liquid to the fourth or fifth decimal by direct reading. This novel device is of a very simple nature and is as easily used as an ordinary bulb hydrometer and is much more accurate than the balanced beam type of hydrometer.

One of the objects of my invention is the provision of a novel and simple hydrometer of great sensitiveness, which may be inserted in the liquid to be measured, and which will not only indicate the density of the liquid with positive accuracy but will also indicate the density directly and without the adjustment of weights or any other means by the operator.

Another object of my invention has to do with the provision of a direct reading hydrometer and means connecting a submerged bob with the hydrometer wherein the weight of the bob is automatically adjusted to suit the density of the liquid. This means preferably comprises a chain so connected to a support and to the bob that it takes the form of a catenary curve when the bob is submerged freely in the liquid, and use is made of the principle that the weight of each side of a chain, when the chain is hanging in a catenary curve, is proportional to the length of the sides. The result is that in a denser liquid the bob naturally rises and pulls up with it a greater length of the attached chain from the supported side to its own side, thus automatically making itself gradually heavier by minute degrees until it becomes so heavy that it no longer rises in the liquid of greater density.

A further object of my invention consists in providing a novel support for the chain, which hangs in a catenary curve, and off-center means for connecting the other end of the chain to the bob. In this case the eccentric positioning of the chain will prevent the bob from turning and the weight of the chain will cause the submerged bob to be deflected away from its normal central position in the hydrometer tube and toward the chain support, so that the bob will be positively held adjacent to, but not in actual contact with, the calibrated portion of the tube.

I have further provided means for always retaining the bob within the hydrometer tube, such means being also adapted to allow free movement of the suspended catenary chain at all positions of the bob. The result is that the bob will be prevented from falling out of the tube when the tube is withdrawn from the liquid and the chain will not contact with the tube as long as the bob is freely submerged, thereby always insuring a free automatic adjustment of the bob by means of the chain.

Another object of my invention has to do with the provision of a novel system of weights for attaching to the hydrometer float or bob so that the same instrument can be used in liquids of widely different densities, and with the same degree of accuracy as would be obtained by using a single bob so formed and weighted as to measure a liquid of a certain definite density. This system of attached weights may preferably consist of two series of removable bulbs, each series consisting of two or more bulbs which differ in weight by a regular amount, and one or both series of bulbs decreasing in volume from the lightest to the heaviest at such a rate as to insure a constant sensitiveness of the hydrometer. The result is that by removing one or both bulbs from the floating system and replacing them with a bulb or bulbs from the rest of the set, such a change in weight of the floating system will be brought about as will adapt it to the determination of any density which it is desired to include in the range of the instrument.

Various other features of my invention will be apparent as this description progresses and will be brought out in the claims appended hereto. The various objects of my invention are preferably obtained by the structure illustrated in the drawings, wherein similar characters of reference designate corresponding parts, and wherein Figure 1 is a vertical section through a vessel containing a liquid and showing my novel density measuring apparatus inserted in the liquid to measure the density thereof.

Figure 2 is an enlarged bottom plan view of the density measuring device showing the contracted lower end of the tube and the recessed portion for allowing free movement of the chain.

Figure 3 is a section of a modified form of tube having a metal collar.

Figure 4 is a bottom plan view of Figure 3 showing the method of retaining the submerged float in the tube.

Figure 5 is a vertical section through a modified form of my invention and showing the chain attached to a vertically movable rod instead of to an enclosing tube.

Figure 6 is an enlarged diagrammatic view of one end of the chain which hangs in a catenary curve between the bob and an independent support.

Figure 7 is a detail side elevation of my density measuring apparatus, showing a modified form of float provided with a projection for accurately measuring dark and opaque liquids, and also showing a novel form of containing vessel for accommodating the hook projection.

Figure 8 is a diagrammatic illustration of a system of bulb weights for changing the weight of the floating system for measuring liquid of widely different densities.

In the drawings, my novel density measuring apparatus is shown as comprising a hollow cylindrical submerged float or bob 1 of any suitable material preferably glass, provided with a contracted portion 2 which opens into a second chamber 3, filled or partially filled with mercury or some other material for weighting the said float. The submerged float 1 is further provided with a hook 4 depending from the portion 3 for the reception of weights 5 and 6.

These weights 5 and 6 are preferably parts of a system of weights so that the instrument can be used in liquids of widely different densities, and all of which weights are provided with suitable means for easily connecting them together or to the main float or bob 1. This system of weights consists of two series of bulbs which may be designated as Series I and Series II.

Series I may consist of a series of two or more bulbs and Series II consists of ten bulbs which differ in weight by a regular amount from the lightest to the heaviest, and as shown in Figure 8 I have provided a Series I of bulbs 5 which increase in weight from 0.0 to 0.8 and a Series II of ten bulbs measuring from 0.00 to 0.09. As the lightest liquids measured commercially have a specific gravity of approximately 0.7+, the main float is so ballasted that together with the lightest bulb 5 of Series I (0.0) and the lightest bulb 6 of Series II (0.00) it constitutes the floating system approximate for liquids of approximately 0.7 specific gravity. It will be obvious that the greater the number of Series I bulbs the greater will be the range of the instrument and thus the Series I bulbs shown in Fig. 8 will adapt the instrument to measure liquids of a specific gravity from 0.7 to 1.5.

The floating system naturally becomes more sensitive as the density is increased. If an instrument of this kind is increased in weight but not changed in volume, it will be more sensitive in the heavier liquid to which its increased weight adapts it, than in the lighter one. This is due to the fact that the density of the liquid is greater rather than to the fact that the instrument is heavier, in order to use it in the denser liquid. If, for example, a given bob and pendant, with chain, is found to be in equilibrium in a given liquid and it is then desired to use the instrument in a much denser liquid, the pendant is taken off and a heavier one put in its place. If, now, this second or heavier pendant has the same volume as the first one, the instrument will be more sensitive in the denser than in the lighter liquid and, obviously, the same scale can not be used without a factor of correction. If, however, the second or heavier pendant is made sufficiently smaller in volume than the first one, the sensitiveness of the instrument is decreased to what it was in the first case and the same scale will then serve. The weight bulbs of Series I are so formed as to decrease in volume from the lightest to the heaviest at such a rate as to correct this increased sensitiveness and insure a constant sensitiveness of the instrument.

The submerged float 1 is further provided with a hook 7 eccentrically attached to the contracted portion 2, as at 8, for the attachment of a chain 9. This chain is preferably made of corrosion resisting material, and hangs in a catenary curve as at 10 and has its other end attached to an outstanding hook 11 which forms an integral part of a tube 12. This eccentric attaching of the hook 7 to the bob 1 will obviously prevent turning of the bob about its vertical axis while freely suspended in the tube 12. The tube 12 is made of some transparent material, preferably glass, and is graduated as at 13 in divisions of any suitable length. A mark 14 is provided on the side of the cylindrical portion of the float 1 for convenient and accurate reading of the position of the said float in relation to the divisions of the graduations 13.

Preferably these divisions 13 on the tube 12 are divided to give values to the third and fourth decimal places and the two series of weight bulbs would permit changes in the floating system, which preferably will always comprise the main float 1 and one bulb of Series I and one bulb of Series II, that will adapt it to variations of specific gravity within any desired limits. In other words, the value marked on the main float plus the one marked on a bulb of Series I gives the specific gravity in units and tenths places, the mark on a bulb of Series II gives the value in hundredths place and the position of the main float on the scale gives the values in the third and fourth decimal places. In a similar manner a series of bulb weights can be made that combined with the main float and the scale readings will give the density of the liquid in the terms of any system, as for example, Baumé.

It is an obvious fact that the weight of the lower part of the chain hanging in the curve 10 tends to bring the two vertical portions of the chain together and, since the hook 7 is adjacent one side of the float 1, that side will at all times be presented to the side of the tube to which the hook 11 is attached. While the float is held in a convenient position for reading its position, it has been proved by experiment that there is at all times a sufficient film of the liquid between the said float and the tube 12 to prevent friction between the surfaces.

I have provided the lower end of the tube 12 with a contracted portion 15 and a flared portion as at 16, adjacent the hook 11, for the free passage of the chain 9, as best shown in Figure 2. The contracted portion 15 is for the purpose of retaining the float 1 in the tube 12 when the instrument is withdrawn from the submerging liquid 17 contained in a vessel 18 of some transparent material.

A modified form of the tube 12 is shown in Figures 3 and 4, wherein the tube has an outstanding flange 19 which rotatably supports a collar 20, having an outstanding hook 21 integral with the said collar 20, and a plurality of downwardly depending and inwardly projecting lugs 22. It will be seen that the inwardly projecting portions 24 of the lugs 22 will hold the collar adjacent the upper portions of the flange 19 as at 23 and that these inward ends 24 will also support the submerged float 1 when the tube 12 is raised from the liquid. It will further be noted that the hook 21 is placed in such a position relative to the ends 24 of the lugs 22 that the chain 9 will pass freely between them. In this form a number of vertical scales may be calibrated at intervals around the tube 12 and these scales may be of different standards. To select any one of these scales it is only necessary to turn the collar 20 so that the hook 21 will be in a vertical plane with the desired scale and the line 14 on the submerged float 1 will be automatically turned to the desired scale. It will also be obvious that the collar 20 may be provided with a plurality of hooks 21 placed at any point around its circumference.

The operation of my density measuring instrument is as follows: The vessel 18 is partially filled with a liquid 17, of which it is desired to find the specific gravity or density, and the instrument is lowered into the liquid until the submerged float 1 is covered by the said liquid 17. The density may then be determined by noting the position the line 14 takes upon the scale 13. The extreme sensitiveness of this instrument is due to the fact that to vary the weight of the portion of the chain 9, supported by the float 1, by so much as the weight of one link of the chain, it is necessary for the float 1 to rise a vertical distance equal to twice the length of the link. This is best shown diagrammatically by Figure 6. To lift the lower link 31, when the power is applied at the point 32, at first only half of the weight of the link will be lifted since the other half will be supported by the hook 11 through the vertical portion of the chain 9. The entire weight of the link will not be lifted until after the link 31 has passed the position shown by the dotted line when the next link will be taken up and the process repeated. Thus, it will be clearly obvious, that as the float rises or falls, the plurality of links forming the curve of the chain will be shifted in position and the effective weight of the link or links at the bottom of the catenary curve will be gradually transferred by infinitesimal amounts from one side of the chain to the other.

In the use of the weight bulbs of the floating system, if the liquid to be measured is approximately 0.7 specific gravity and the position of the main float on the scale 13 is 45 the marks on the main float 1 and the bulb weights 5 and 6 are then noted; main float 0.7 and the two bulb weights 0.0 and 0.00. Thus these marks when combined give the specific gravity reading 0.7045. To adapt the instrument to a liquid of specific gravity between 0.91 and 0.92 bulb 0.0 is replaced by bulb 0.2 and bulb 0.00 replaced by bulb 0.01. If now the scale reading is 85 then the specific gravity is $$0.7 + 0.2 + 0.01 + 0.0085 = 0.9185.$$

A modified form of my density measuring apparatus is shown in Figure 7. This instrument is similar to the form shown in Figure 1 with the exception that I have provided a small projection 33 on the upper half of the float on the side of which is placed the hook 7 for attaching the chain 9. On this projection 33 is the mark 14 corresponding to the mark 14 on the float in Figure 1. This projection 33 keeps the mark on the float closer to the scale 13 on the tube 12 and facilitates reading the position of the float, and also insures that the depth of the liquid between the mark on the float and the scale tube is a mere film and thus makes possible the accurate reading of the instrument when used with dark colored or nearly opaque liquids. The projection 33 holds the float at some distance from the tube 12 and thus permits the use of a shorter shank 11. I have provided a novel vessel 34 the upper portion 35 of which is of a diameter large enough to admit the tube 12 and hook 11 and the lower portion 36 of which is enlarged to permit the tube 12 to be held against the surface 35. Thus, this enlargement 36 of the lower portion of the vessel 34 and the projection 33 on the main float will insure accurate and direct reading at all times.

A further modified form of my density measuring apparatus is shown in Figure 5. In this form the vessel 18 is provided with a mark 25 upon its side and the mark 14 is caused to coincide with the said mark 25 by raising or lowering the calibrated rod 26, to which one end of the chain 9 is attached, and the addition of weights 5 when necessary. The specific gravity of the liquid is read from scale 27 by the aid of a pointer 28 attached to a plate 29 resting upon the upper edge of the vessel 18 and which is provided with an orifice 30 for free vertical movement of the rod 26. In this form it is more convenient to have the line 14 diametrically opposite the hook 7 on the float.

It will be apparent that the chain 9 may be varied per unit weight of length, in total length, or in the material of which it is made in accordance with the nature of the liquid being measured. It will also be obvious that, by increasing the size of the bob and decreasing the size of the chain, the sensitiveness of the instrument will be increased.

It will be seen that I have provided a very simple and sensitive means for making accurate and direct measurement of the density of liquids having a wide range of specific gravity, and one that may be advantageously used for all scientific measurements as well as for the simplest of test and inspection work.

Obviously, my invention make take many different forms in that the shape of the containing vessel and the independent support for the chain may be made in a variety of different forms; that the chain 10 may be of any length and attached at any point on the containing vessel or measuring tube; and that the calibrated rod 26 may be adjusted by various means in combination with reading means such as vernier. All such changes, however, are within the scope of the appended claims.

In the operation of my device it will be understood that in utilizing different weight bulbs 5 and 6 or different bobs 1 that the difference in the weights of such bulbs or bobs merely adapts the device to liquids of different densities and that the variation in size of such bulbs or bobs affects the sensitiveness of the instrument. It will further be understood that the various bulbs and bobs of my instrument for measuring densities of various liquids are corrected as to size or volume so as to compensate for the change in sensitiveness of the instrument due to the variation in the density of various liquids.

Having thus described my invention, what I claim is:

1. In an apparatus for measuring the density of liquids, a calibrated tubular member; a submerged member lighter than the liquid in which it is to function surrounded by said member and vertically movable within the space defined by said member, and a chain connecting the said submerged member to said member, one end of said chain being supported by the bottom portion of said submerged member and the other end being supported by said member, the said connecting chain forming a catenary curve.

2. In an apparatus for measuring the density of liquids, a calibrated member, a submerged member lighter than the liquid in which it is to function having a reduced end portion, means depending from the reduced end portion of said submerged member for varying the weight of said submerged member, and a chain connecting the said submerged member to said member, one end of said chain being supported by said submerged member at a point adjacent said reduced end portion and the other end being supported by said member, said connecting chain defining a catenary curve.

3. In an apparatus for measuring the density of liquids, a calibrated tubular member provided with a contracted end, a submerged member lighter than the liquid in which it is to function mounted within said member and vertically movable within the space defined by said member, and a chain connecting the said submerged member to said member, one end of the chain being supported by said submerged member at a point adjacent said reduced end portion and the other end being supported by said member, the said chain maintaining the form of a catenary curve regardless of the position of the said submerged member within the said member.

4. An apparatus for measuring the density of liquids comprising a calibrated member, a submerged member lighter than the liquid in which it is to function having a reduced end portion, means depending from the reduced end portion of said submerged member for varying the weight of said submerged member, and a chain connecting said submerged member to said member, one end of said chain being supported by the said submerged member at a point adjacent said reduced end portion and the other end of said chain being secured to said member, said means embodying one or more units of different systems of weights.

5. An apparatus for measuring the density of liquids comprising a calibrated member, a submerged member lighter than the liquid in which it is to function having a reduced end portion, means depending from the reduced end portion of said submerged member for varying the weight of said submerged member and a chain connecting the said submerged member to said member, one end of the said chain being supported by the said submerged member at a point adjacent the said reduced end portion and the other end of said chain being supported by said member, said means embodying one or more units of different systems of weights, the units of one of said systems of weights being adapted to measure the density in tenth units and the units of the other of said systems being adapted to measure the density in hundredth units.

6. An apparatus for measuring the density of liquids comprising a calibrated member, a submerged member lighter than the liquid in which it is to function having a reduced end portion, means depending from the reduced end portion of said submerged member for varying the weight of said submerged member, and a chain in the form of a catenary curve connected at its ends to said submerged member and to said calibrated member, said means embodying one or more units of different systems of weights.

7. An apparatus for measuring the density of liquids comprising a calibrated member, a submerged member lighter than the liquid in which it is to function having a reduced end portion, means depending from the reduced end portion of said submerged member for varying the weight of said submerged member, and a chain in the form of a catenary curve connecting said submerged member to said member, said means embodying one or more units of different systems of weights, the units of one of said systems of weights being adapted to measure the density in tenth units and the units of other of said systems being adapted to measure the density in hundredth units.

8. In an apparatus for measuring the density of liquids, a calibrated tubular member, a submerged member lighter than the liquid in which it is to function surrounded by said member and vertically movable within the space defined by said member, and a chain connecting the said submerged member to said member, one end of the said chain being supported by the bottom portion of said submerged member and the other end being supported by said member, said submerged member being provided with means tending to prevent lateral movement of said submerged member within the space defined by said member.

In testimony whereof I hereby affix my signature.

CHARLES W. FOULK.